(12) United States Patent
Min et al.

(10) Patent No.: US 7,333,541 B2
(45) Date of Patent: Feb. 19, 2008

(54) VARIABLE SQUARE-WAVE DRIVE DEVICE

(75) Inventors: Byoung Own Min, Kyungki-do (KR);
Hyun Jin Kim, Kyungki-do (KR);
Hyoung Jun Jeon, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 677 days.

(21) Appl. No.: 10/849,960

(22) Filed: May 21, 2004

(65) Prior Publication Data

US 2005/0213653 A1 Sep. 29, 2005

(30) Foreign Application Priority Data

Mar. 29, 2004 (KR) ............ 10-2004-0021355

(51) Int. Cl.
*H04B 17/00* (2006.01)
(52) U.S. Cl. ................................................. 375/238
(58) Field of Classification Search ............. 375/238
See application file for complete search history.

(56) References Cited

U.S. PATENT DOCUMENTS

| 4,190,330 | A |   | 2/1980  | Berreman              |
|-----------|---|---|---------|-----------------------|
| 4,745,403 | A | * | 5/1988  | Tamura ........... 345/101 |
| 4,888,609 | A | * | 12/1989 | Hamada et al. ...... 396/104 |
| 4,989,958 | A | * | 2/1991  | Hamada et al. ...... 359/666 |
| 5,047,847 | A | * | 9/1991  | Toda et al. ............ 348/68 |
| 5,066,301 | A | * | 11/1991 | Wiley ............... 623/6.13 |
| 5,157,431 | A | * | 10/1992 | Mabuchi et al. ...... 396/80 |
| 5,359,444 | A | * | 10/1994 | Piosenka et al. ...... 349/13 |
| 5,712,721 | A |   | 1/1998  | Large                 |
| 5,729,510 | A | * | 3/1998  | Kasahara et al. ... 369/44.14 |
| 5,861,936 | A | * | 1/1999  | Sorensen ........... 351/200 |
| 6,344,930 | B1 | * | 2/2002  | Kaneko et al. ....... 359/666 |
| 6,433,770 | B1 |   | 8/2002  | Gross et al.          |
| 6,952,313 | B2 | * | 10/2005 | Schrader ............ 359/666 |
| 6,969,958 | B2 | * | 11/2005 | Henry ................. 315/291 |
| 2004/0150585 | A1 | * | 8/2004 | Tomisawa .............. 345/6 |

FOREIGN PATENT DOCUMENTS

| JP | 54-99654    | 8/1979  |
| JP | 61-110126   | 5/1986  |
| JP | 05-508244   | 11/1993 |

* cited by examiner

*Primary Examiner*—David C. Payne
*Assistant Examiner*—Leon Flores
(74) *Attorney, Agent, or Firm*—Lowe Hauptman Ham & Berner

(57) ABSTRACT

A variable square-wave drive device for controlling square waves using feedback- and bias-control methods. The variable square-wave drive device includes an oscillator for generating a clock pulse; a frequency-divider/duty controller for frequency-dividing the clock pulse received from the oscillator to generate a clock signal and a square-wave signal; a drive for amplifying the square-wave signal received from the frequency-divider/duty controller according to a bias voltage, generating first and second square-wave signals having opposite phases, and outputting the first and second square-wave signals as a square-wave drive signal; a feedback controller for comparing a predetermined voltage variable determined by a user with the bias voltage of the drive to generate a comparison result signal; a switching controller for generating a switching signal upon receiving the comparison result signal from the feedback controller; and a bias voltage regulator for charging/discharging the input voltage according to the switching signal received from the switching controller so that it can adjust the bias voltage of the drive.

16 Claims, 10 Drawing Sheets

(a)

(b)

VARIABLE SQUARE-WAVE DRIVE DEVICE

BACKGROUND OF THE INVENTION

1. Field of the Invention

The present invention relates to a variable square-wave drive device for use in camera modules such as an HHP (Hand Held Phone), and more particularly to a variable square-wave drive device for controlling square waves using a feedback- or bias-control method to vary the square waves, such that it can correctly control a curvature of an LL (Liquid Lens), and can more precisely and stably control focus and zoom functions of a camera module.

2. Description of the Related Art

Typically, two different liquids are contained in a transparent body of an LL, and individual curvatures of the liquids can be adjusted by a driving voltage, such that it is well known in the art that the focus and zoom functions of the camera module can be controlled without using additional mechanical mechanisms.

Optical devices using liquid crystal lens have been disclosed in U.S. Pat. Nos. 4,190,330 and 6,433,770, which are incorporated herein by reference.

The liquid lens disclosed in U.S. Pat. No. 4,190,330 is shown in FIG. 1.

FIG. 1 is an exploded perspective view illustrating a conventional liquid lens. Referring to FIG. 1, the liquid lens includes a transparent substrate 13 and a polarizer 11 having optically transparent-coated concave surfaces to be installed facing each other, and an electrical conductive electrode 14 coated with a liquid crystal array layer 15. The polarizer 11 is aligned in an X-axis direction of each director of a liquid crystal material contained in the array layer 15's space. The electrode 14 is connected to a voltage generator 16, such that an electric field induced by the voltage generator 16 is generated between the electrodes 14.

As the electric field intensity between the electrodes 14 gradually increases, the liquid crystal material's director moves to a Z-axis direction by a predetermined length directly associated with the electric field intensity.

Many developers have recently conducted intensive research into a variety of devices for driving such liquid crystal lens, and a representative drive circuit disclosed in U.S. Pat. No. 6,433,770 is shown in FIG. 2.

Referring to FIG. 2, the drive circuit includes a detector 1 for detecting an optical signal, a filter/buffer unit 2 for filtering an output signal of the detector 1, and an oscillator 3 for generating a predetermined frequency, and controlling a duty cycle of the predetermined frequency according to a control signal of the filter/buffer unit 2.

The aforementioned conventional drive circuit varies optical density in response to peripheral optical signals, such that it can constantly adjust a brightness or luminance of a liquid lens.

However, the aforementioned conventional liquid crystal lens drive circuit cannot control a curvature of the LL, such that it is also unable to perform a focus control function capable of being carried out using such a curvature control function.

In conclusion, the conventional LL drive circuit must control the LL's curvature, and further, must more correctly control the LL's curvature.

SUMMARY OF THE INVENTION

Therefore, the present invention has been made in view of the above problems, and it is an object of the invention to provide a variable square-wave drive device for controlling square waves using a feedback- or bias-control method to vary the square waves, such that it can correctly control a curvature of an LL (Liquid Lens), and can more precisely and stably control focus and zoom functions of a camera module.

In accordance with the present invention, these objects are accomplished by providing a variable square-wave drive device for controlling a pair of square-wave drive signals having opposite phases, comprising: a power-supply unit for receiving an input voltage, and transmitting a necessary voltage to individual components; an oscillator for generating a clock pulse having a predetermined frequency; a frequency-divider/duty controller for receiving the clock pulse from the oscillator, frequency-dividing the clock pulse using predetermined frequency division rates, and generating a clock signal and a square-wave signal; a drive for receiving the square-wave signal from the frequency-divider/duty controller, amplifying the square-wave signal at an amplification rate determined by a bias voltage, generating first and second square-wave signals having opposite phases according to the amplified square-wave signal, and outputting the first and second square-wave signals as a pair of square-wave drive signals; a feedback controller for comparing a predetermined voltage variably determined by a user with the bias voltage of the drive, and generating a comparison result signal; a switching controller for generating a switching signal according to the comparison result signal received from the feedback controller; and a bias voltage regulator for charging/discharging the input voltage of the drive according to the switching signal of the switching controller, and regulating the bias voltage of the driver by charging/discharging the input voltage.

Preferably, the variable square-wave drive device may include a Liquid Lens (LL) driven by a pair of square-wave drive signals having opposite phases, and controlled by a peak-to-peak value of the square-wave drive signals.

Preferably, the power-supply unit may be powered on or off by an input power-saving signal to reduce power consumption.

Preferably, the switching controller may perform an AND operation between the comparison result signal received from the feedback controller and the clock signal received from the frequency-divider/duty controller, so that it can generate a switching signal.

Preferably, the switching controller may be synchronized with the clock signal of the frequency-divider/duty controller, so that it can be more correctly performed.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
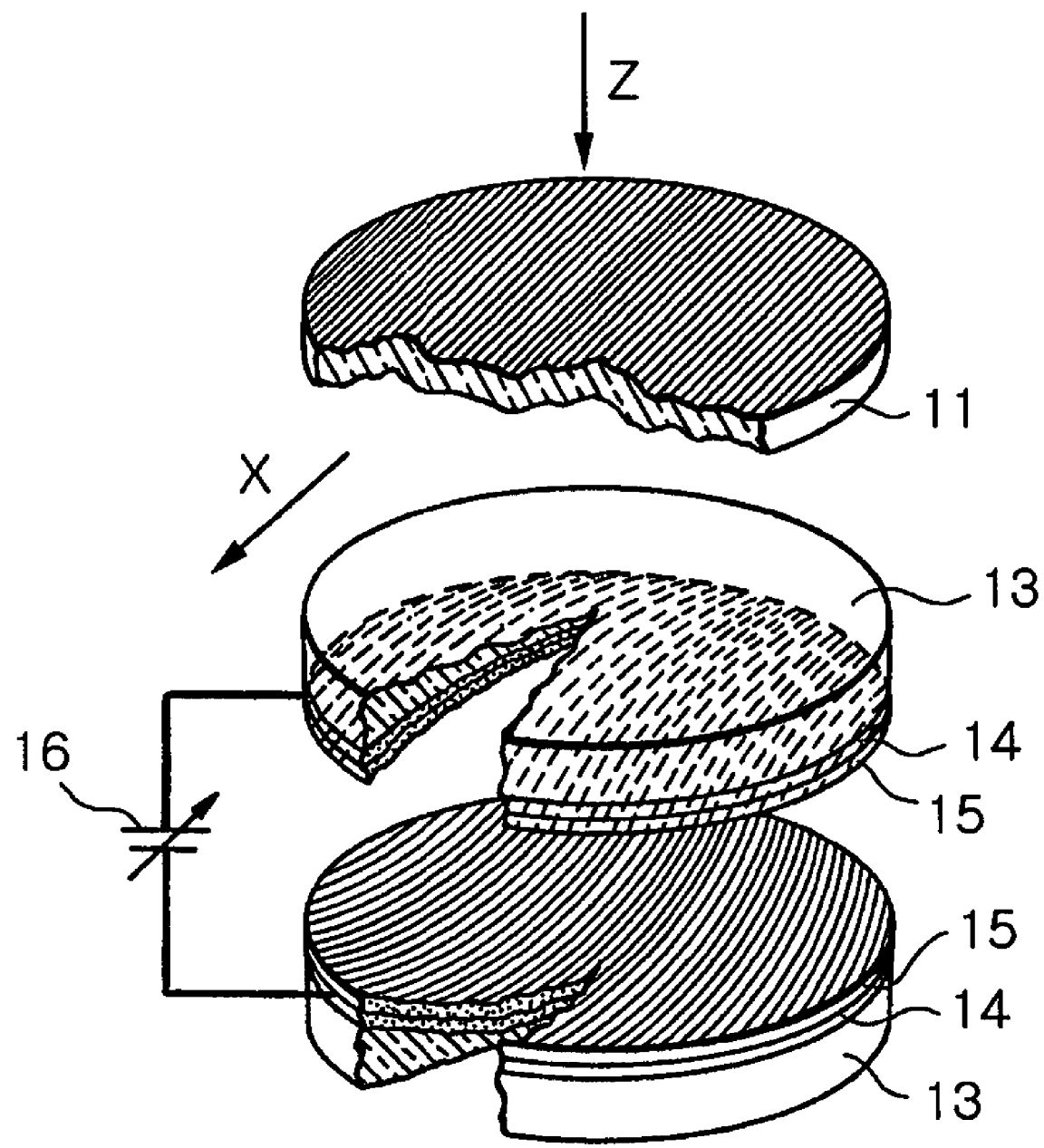
FIG. 1 is an exploded perspective view illustrating a conventional Liquid Lens (LL)
Figure 2:
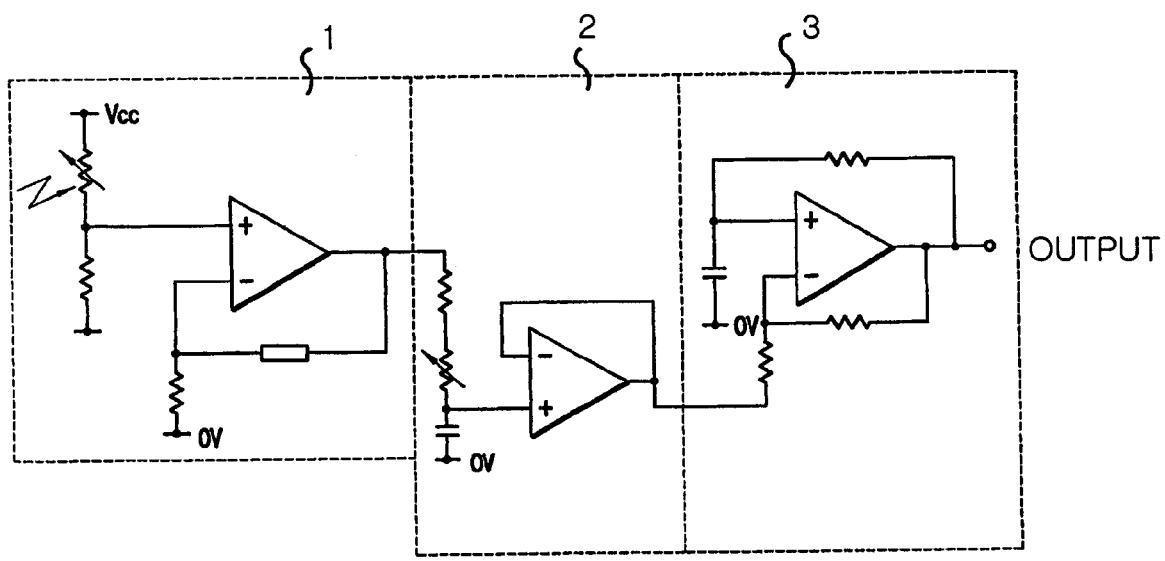
FIG. 2 is a circuit diagram illustrating a conventional LL.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 3:
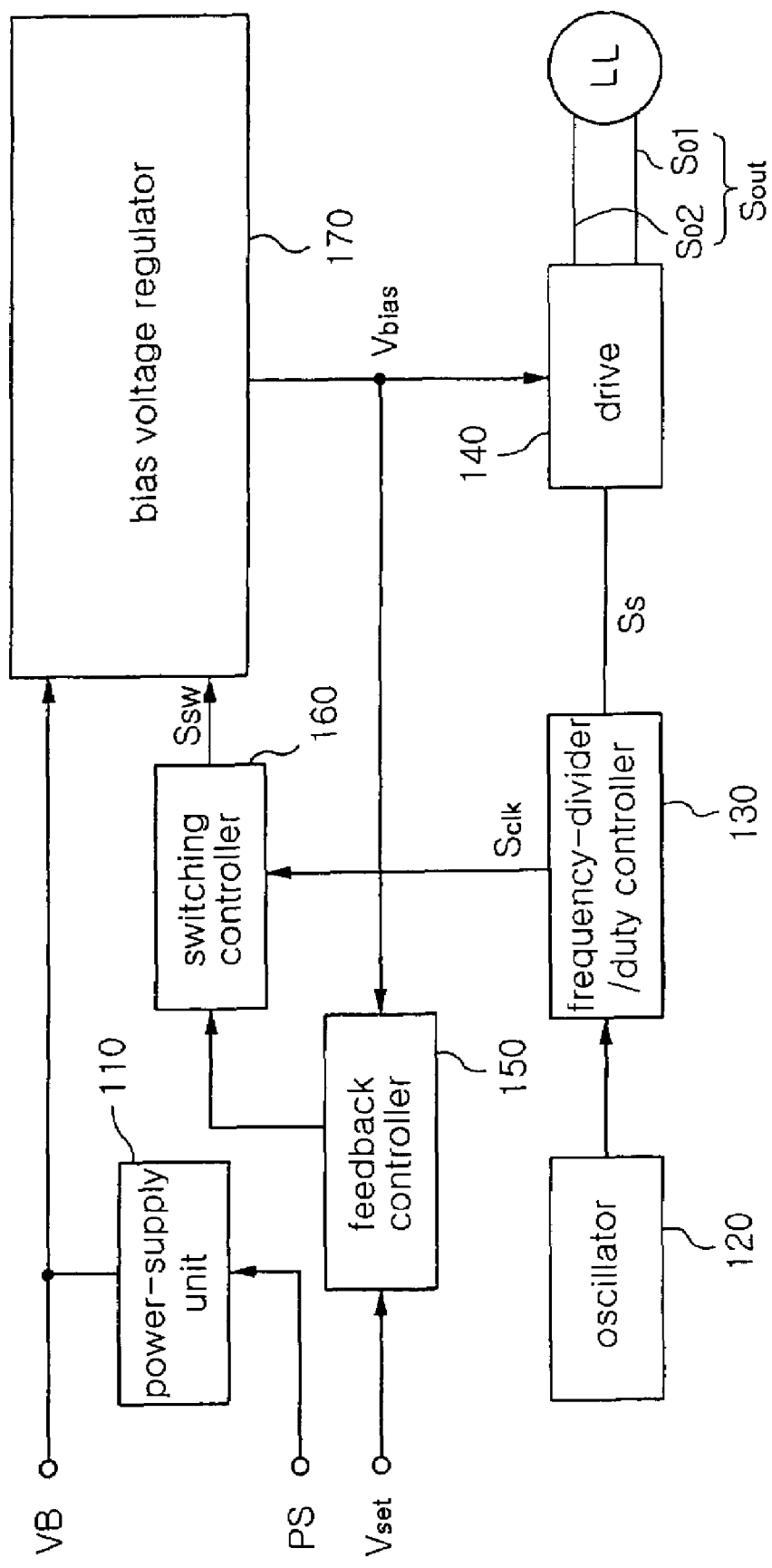
FIG. 3 is a block diagram illustrating a variable square-wave drive device in accordance with the present invention.

FIG. 3 is a block diagram illustrating a variable square-wave drive device in accordance with the present invention.

Referring to FIG. 3, the variable square-wave drive device acts as a device for controlling a pair of square-wave drive signals having opposite phases.

The variable square wave driving device of the present invention includes a power-supply unit 110 for receiving an input voltage VB, and transmitting a necessary voltage to individual components; an oscillator 120 for generating a clock pulse Cp having a predetermined frequency; a frequency-divider/duty controller 130 for receiving the clock pulse from the oscillator 120, frequency-dividing the clock pulse Cp using predetermined frequency division rates, and generating a clock signal Sclk and a square-wave signal Ss; a drive 140 for receiving the square-wave signal Ss from the frequency-divider/duty controller 130, amplifying the square-wave signal Ss at an amplification rate determined by a bias voltage Vbias to generate a first square-wave signal So1, and inverting the square-wave signal So1 to generate a second square-wave signal So2, such that it outputs the first and second square-wave signals So1 and So2 having opposite phases as a pair of square-wave drive signals Sout; a feedback controller 150 for comparing a predetermined voltage Vset variably determined by a user with the bias voltage Vbias of the drive 140, and generating a comparison result signal Sd; a switching controller 160 for generating a switching signal Ssw according to the comparison result signal Sd received from the feedback controller 150; and a bias voltage regulator 170 for charging/discharging the input voltage VB of the drive 140 according to the switching signal Ssw of the switching controller 160, and regulating the bias voltage Vbias of the driver 140 by charging/discharging the input voltage VB.

The variable square-wave drive device is driven by a pair of square-wave drive signals having opposite phases, and further includes an LL controlled by peak-to-peak values of the square-wave drive signals.

The power-supply unit 110 is powered on or off by an input power-saving signal PS. Preferably, if the power-supply unit 110 is powered on, the power-supply unit 110 may receive the input voltage VB, and may provide individual components with necessary voltages. In this case, the power-saving signal PS may be equal to a signal based on a user's selection, and may also be equal to a signal based on a used state of a camera module of a mobile phone equipped with the variable square-wave drive device of the present invention.

Figure 4:
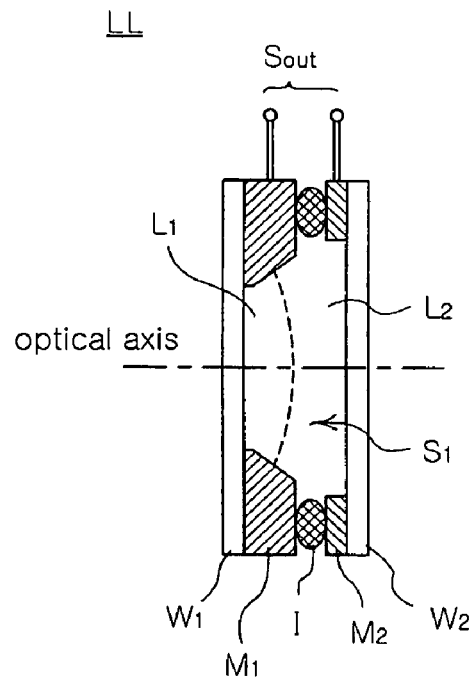
FIG. 4 is a cross-sectional view illustrating an LL for use in a variable square-wave drive device in accordance with the present invention.

FIG. 4 is a cross-sectional view illustrating an LL for use in a variable square wave driving device in accordance with the present invention.

Referring to FIG. 4, the LL for use in the drive device of the present invention includes transparent window layers W1 and W2 installed to both outer sides, two metal layers M1 and M2 formed at individual inner edges of the window layers W1 and W2 to provide the square-wave drive signal Sout so that they act as an electrode, and an insulation layer I formed between two metal layers M1 and M2 to electrically insulate the metal layers M1 and M2 from each other. Two liquids L1 and L2 having different gravities are not mixed in the inner space formed by the window layers W1 and W2, the metal layers M1 and M2, and the insulation layer I, and are stored in the same inner space while being classified according to their gravities. Two liquids L1 and L2 are each aligned perpendicular to an optical axis.

Figure 5:
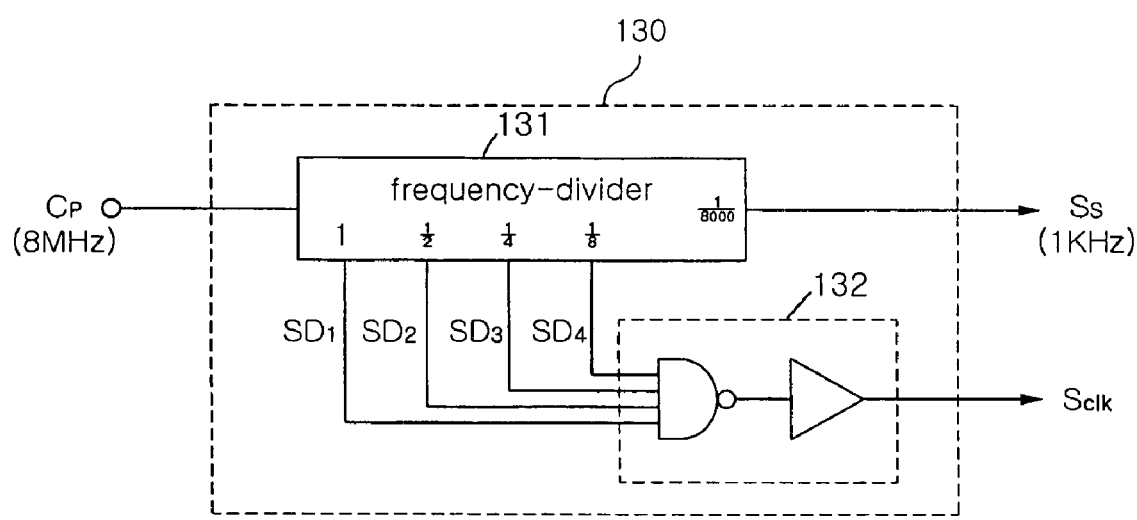
FIG. 5 is a circuit diagram illustrating a frequency-divider/duty controller in accordance with the present invention.

FIG. 5 is a circuit diagram illustrating a frequency-divider/duty controller in accordance with the present invention.

Referring to FIG. 5, the frequency-divider/duty controller 130 includes a frequency divider 131 and a NAND operator 132. The frequency divider 131 receives the clock pulse Cp from the oscillator 120, frequency-divides the clock pulse Cp using individual frequency division rates to generate a plurality of frequency division pulses, and frequency-divides the clock pulse Cp using a predetermined square-wave frequency division rate to generate a square-wave signal Ss. The NAND operator 132 performs a NAND operation of the plurality of frequency division signals received from the frequency-divider 131, and generates a clock signal Sclk.

Figure 6:
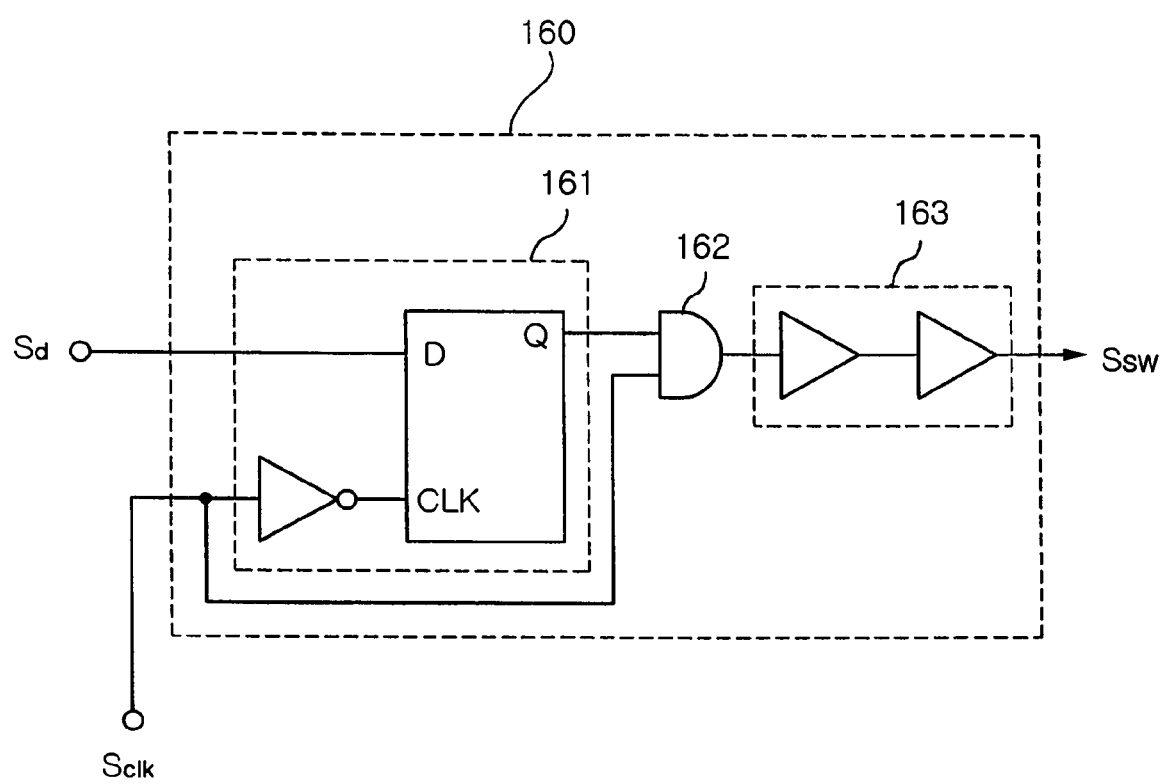
FIG. 6 is a circuit diagram illustrating a switching controller in accordance with the present invention.

FIG. 6 is a circuit diagram illustrating a switching controller in accordance with the present invention.

Referring to FIG. 6, upon receiving the comparison result signal Sd from the feedback controller 150, the switching controller 160 generates a switching signal Ssw using a PTM (Pulse Time Modulation) scheme. In order to allow the switching controller 160 to perform more correctly, it is preferable for the switching controller 160 to be synchronized with the clock signal Sclk of the frequency-divider/duty controller 130.

In this case, the PTM (Pulse Time Modulation) scheme is adapted to vary a pulse time according to the magnitude of a signal, and includes a PWM (Pulse Width Modulation) scheme for varying a pulse width according to the signal magnitude, a PPM (Pulse Position Modulation) scheme for varying a pulse position according to the signal magnitude, and a PFM (Pulse Frequency Modulation) scheme for varying a pulse frequency according to the signal magnitude.

The switching controller 160 may adapt either one of the PWM, PPM, and PFM schemes contained in the PTM scheme.

In the case of adapting the PFM scheme to the switching controller 160, the switching controller includes a synchronizer 161, an AND operator 162, and a buffer 163. The synchronizer 161 is synchronized with the clock signal Sclk of the frequency-divider/duty controller 130, and generates a comparison result signal Sd received from the feedback controller 150. The AND operator 162 performs an AND operation between the output signal of the synchronizer 161 and the clock signal Sclk of the frequency-divider/duty controller 130, and thereby generates a switching signal Ssw. The buffer 163 receives the switching signal Ssw from the AND operator 162, and generates the received switching signal Ssw.

In this case, the synchronizer 161 may be implemented with a D flip-flop.

Figure 7:
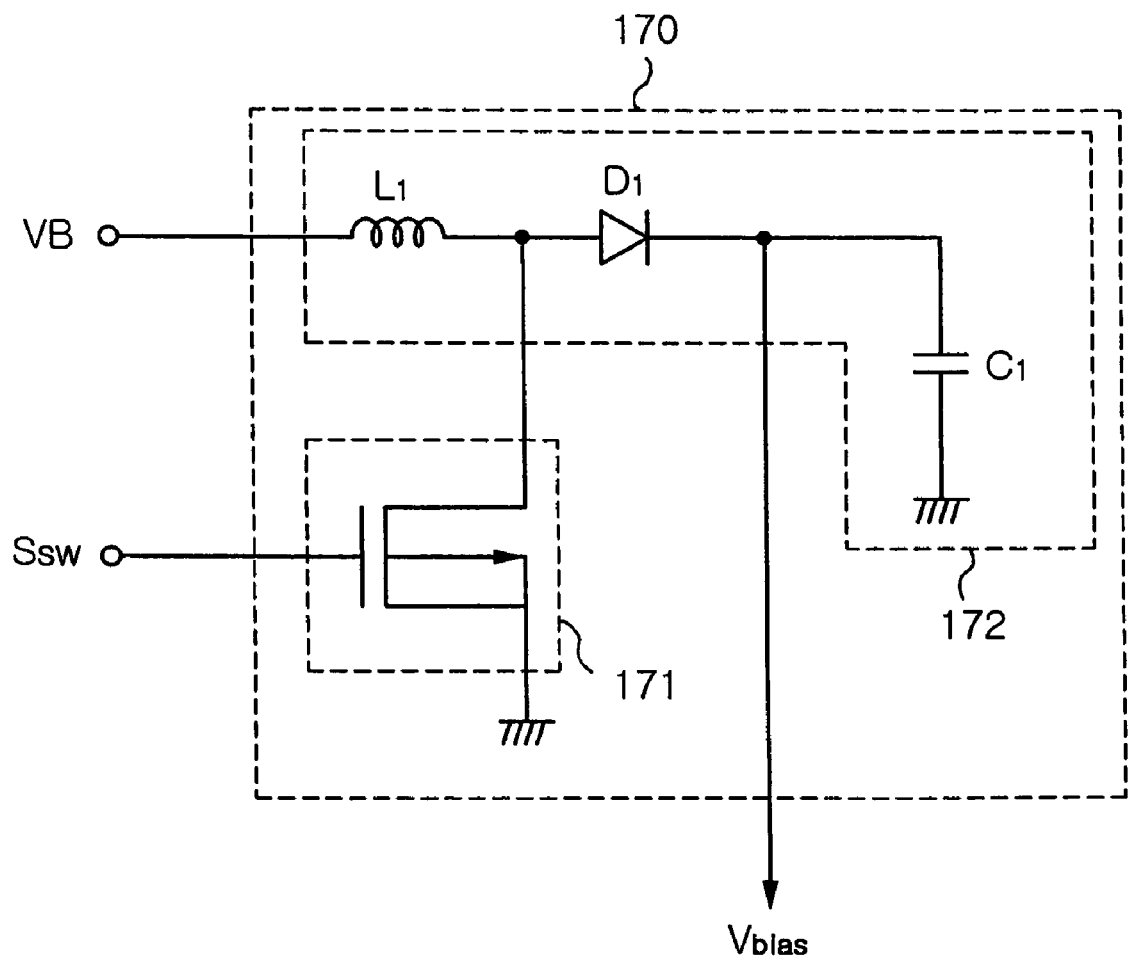
FIG. 7 is a circuit diagram illustrating a bias voltage controller in accordance with the present invention.

FIG. 7 is a circuit diagram illustrating a bias voltage controller in accordance with the present invention.

Referring to FIG. 7, the bias voltage regulator 170 includes a switching unit 171, and a charging/discharging unit 172. The switching unit 171 switches on or off a connection between the input voltage VB and a ground terminal according to the switching signal Ssw received from the switching controller 160. The charging/discharging unit 172 charges/discharges the input voltage VB according to the switching on/off operations of the switching unit 160, such that it regulates the bias voltage Vbias of the drive 140.

Figure 8:
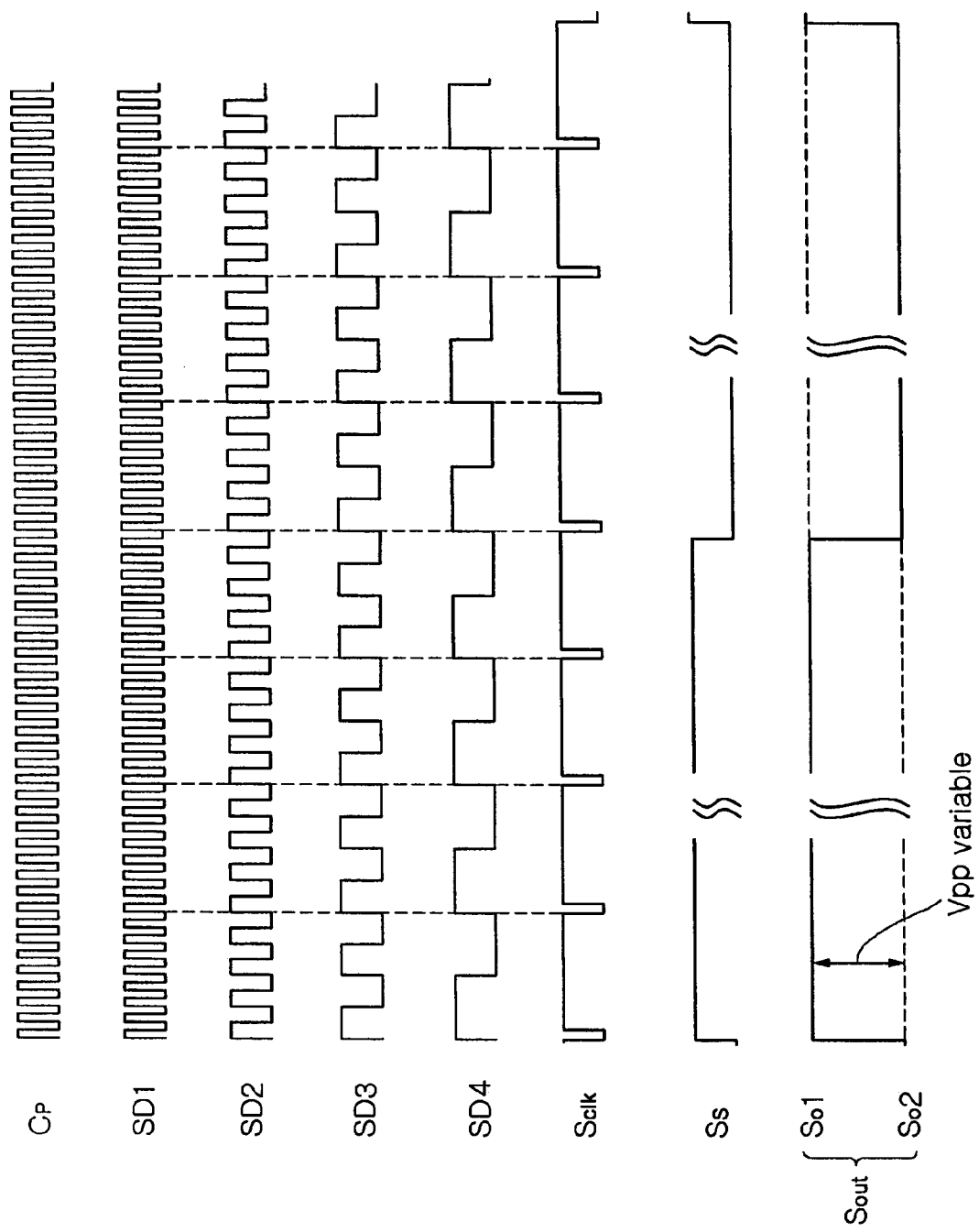
FIG. 8 is a timing diagram illustrating the principal signals in accordance with the present invention.

FIG. 8 is a timing diagram illustrating the principal signals in accordance with the present invention.

Referring to FIG. 8, the reference character Cp is a clock pulse generated from the oscillator 120, the reference characters SD1~SD4 are division pulses generated from the frequency divider 131 of the frequency-divider/duty controller 130, the reference character Sclk is a clock signal generated from the frequency-divider/duty controller 130, and the reference character Ss is a square-wave signal generated from the frequency divider 131 of the frequency-divider/duty controller 130. The reference character Sout is a pair of square-wave drive signals including the first and second square-wave signals So1 and So2 having opposite phases.

Figure 9:
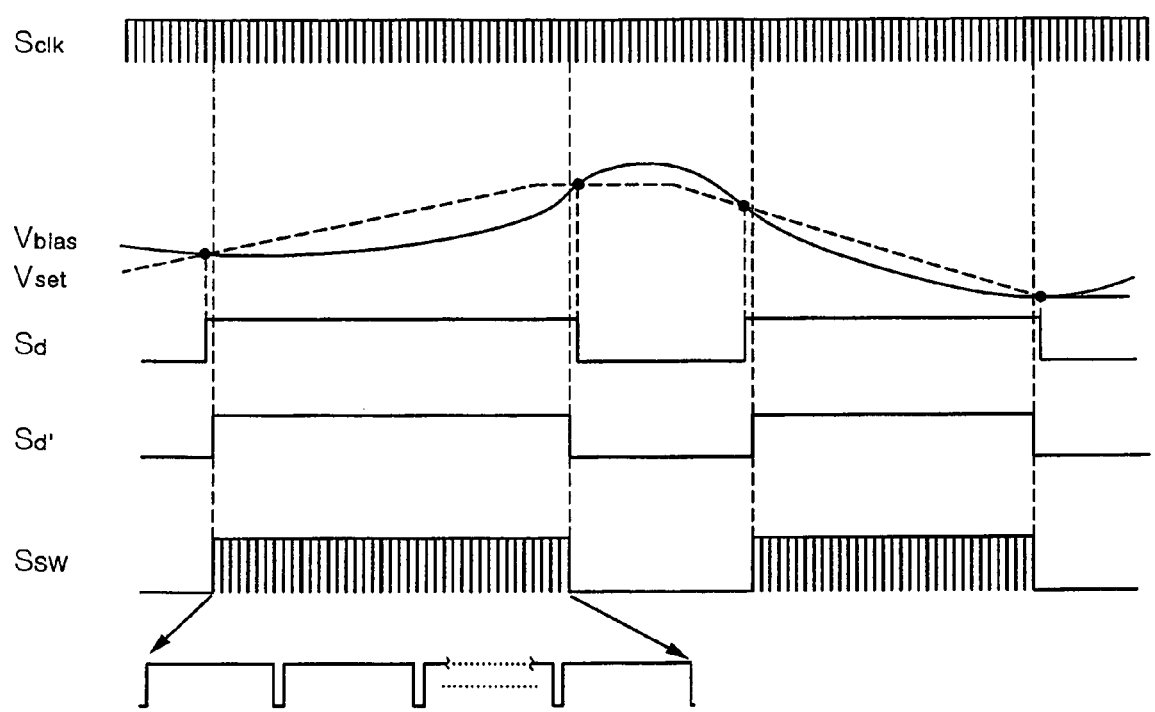
FIG. 9 is a timing diagram illustrating signals associated with a switching signal in accordance with the present invention.

FIG. 9 is a timing diagram illustrating signals associated with a switching signal in accordance with the present invention.

Referring to FIG. 9, the reference character Vbias is a bias voltage transmitted to the drive 140 by the bias voltage regulator 170, the reference character Vset is a voltage variably determined by a user to adjust an LL curvature, the reference character Sd is an output signal of the feedback controller 150, the reference character Sd' is a signal synchronized by the clock signal Sclk, and the reference character Saw is an output signal of the switching controller 160.

Figure 10:
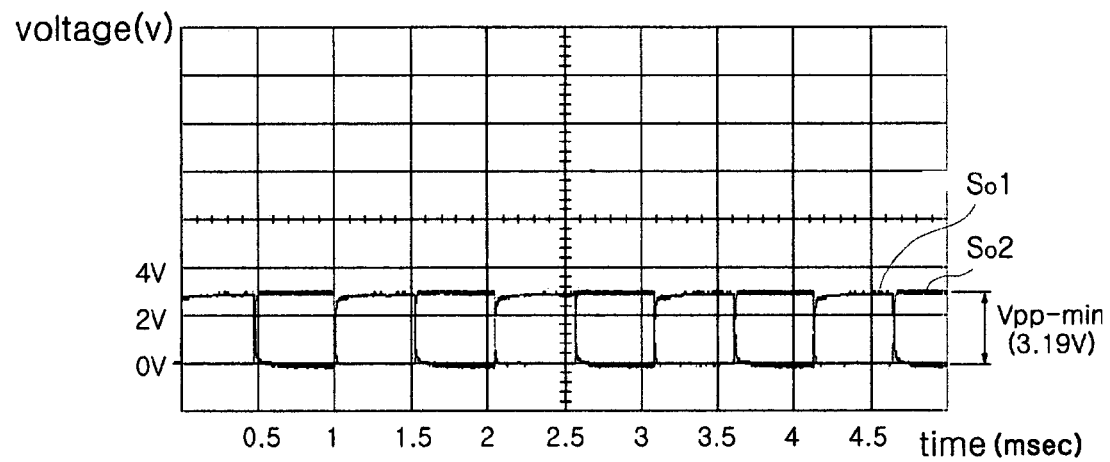
FIGS. 10a~10b are waveform diagrams illustrating a square-wave drive signal in accordance with the present invention.
Figure 10:
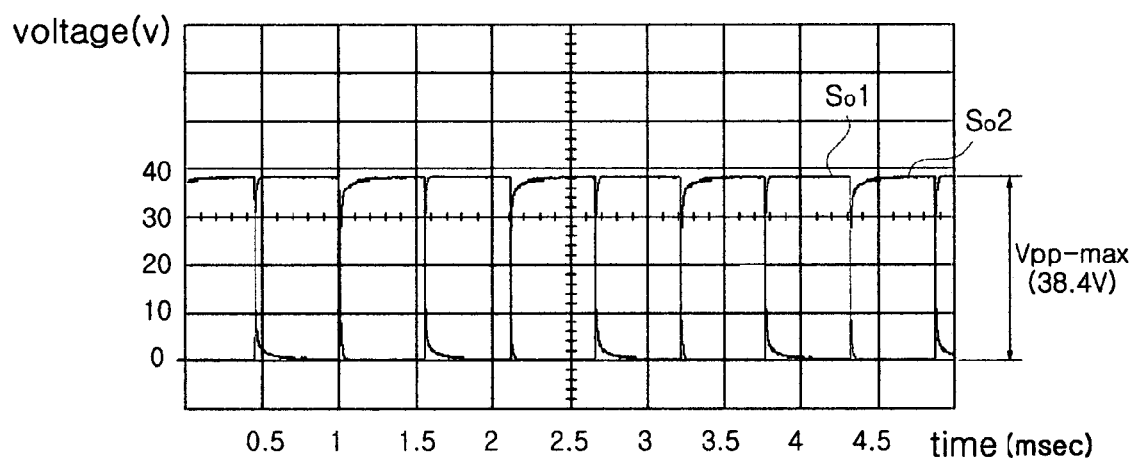

FIGS. 10a~10b are waveform diagrams illustrating a square-wave drive signal in accordance with the present invention.

FIG. 10a is a waveform diagram illustrating a square-wave drive signal having the lowest peak-to-peak value Vpp-min, and FIG. 10b is a waveform diagram illustrating a square-wave drive signal having the highest peak-to-peak value Vpp-max.

Figure 11:
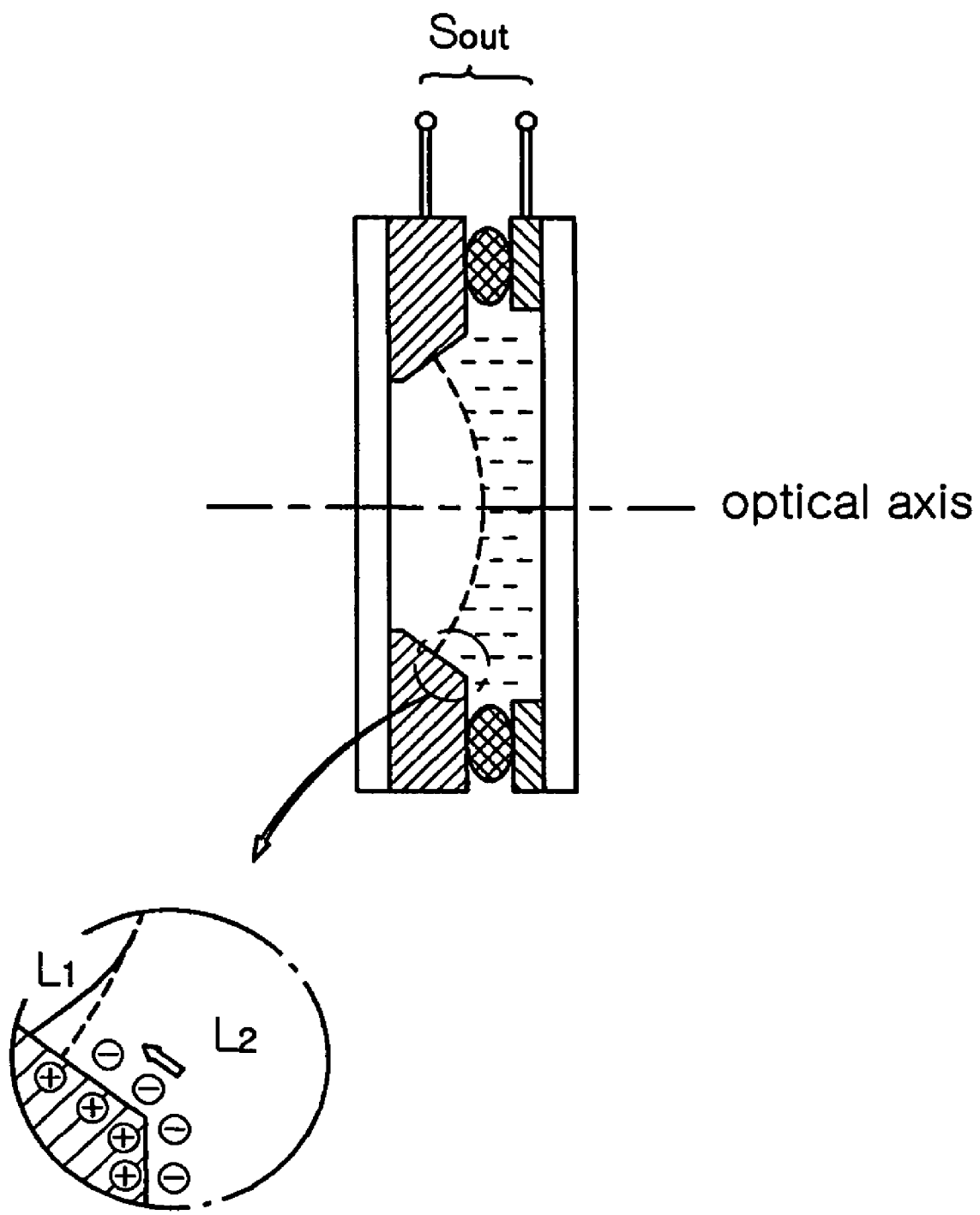
FIG. 11 is a conceptual diagram illustrating the LL's curvature control principle in accordance with the present invention.

FIG. 11 is a conceptual diagram illustrating the LL's curvature control principle in accordance with the present invention.

In more detail, the LL's curvature control principle based on the variable square-wave drive device of the present invention is described in FIG. 11.

Operations and effects of the present invention will hereinafter be described with reference to the accompanied drawings.

Referring to FIGS. 3 and 4, the variable square-wave drive device of the present invention drives the LL. The LL is operated by a pair of square-wave drive signals Sout having opposite phases, its curvature is controlled by a peak-to-peak value Vpp of the square-wave drive signal, and its detailed description will hereinafter be described.

The power-supply unit 110 of the LL drive device of the present invention receives a predetermined input voltage VB from among about 2.5V~5V, and transmits a necessary voltage to individual components. In this case, the power-supply unit 110 is powered on or off by the input power-saving signal PS, and receives the input voltage VB in the case of a powering-on mode, such that it transmits a necessary voltage to individual components.

The oscillator 120 generates the clock pulse Cp having a predetermined frequency, and outputs the clock pulse Cp to the frequency-divider/duty controller 130. For example, the clock pulse Cp may be determined in the range of 4 MHz to 10 MHz.

The frequency-divider/duty controller 130 receives the clock pulse Cp from the oscillator 120, frequency-divides the clock pulse Cp using predetermined frequency division rates to generate the clock signal Sclk and the square wave signal Ss, and its detailed description will hereinafter be described with reference to FIGS. 3 to 5.

Referring to FIGS. 3 to 5, the frequency divider 131 of the frequency-divider/duty controller 130 frequency-divides the clock pulse Cp using predetermined frequency division rates, such that it generates a plurality of frequency division pulses SD1~SD4. The frequency divider 131 frequency-divides the clock pulse Cp using a predetermined square-wave frequency division rate, such that it generates a square-wave signal Ss.

For example, in the case where the clock pulse is set to 8 MHz, individual frequency division rates are set to 1, ½, ¼, and ⅛, and the square-wave frequency rate is set to ⅛₀₀₀, the frequency divider 131 frequency-divides the clock pulse of 8 MHz using individual frequency division rates 1, ½, ¼, and ⅛, such that individual frequencies of the frequency division pulses SD1, SD2, SD3, and SD4 are determined to be 8 MHz, 4 MHz, 2 MHz, and 1 MHz, respectively. The clock pulse of 8 MHz is frequency-divided by a square-wave frequency division rate "⅛₀₀₀", such that a frequency of the square-wave signal Ss is determined to be about 1 KH.

The NAND operator 132 of the frequency-divider/duty controller 130 receives the frequency division signals SD1, SD2, SD3, and SD4 from the frequency divider 131, performs a NAND operation of the frequency division signals SD1, SD2, SD3, and SD4, and thereby generates the clock signal Sclk. For example, the NAND operator 132 performs a NAND operation of the frequency division pulse signals SD1~SD4 having frequencies of 8 MHz, 4 MHz, 2 MHz, and 1 MHz, such that it generates the clock signal Sclk of about 1 MHz as shown in FIG. 8.

In the meantime, the feedback controller 150 compares a predetermined voltage Vset variably determined by a user to adjust the LL's curvature with the bias voltage Vbias of the drive 140, such that it generates the comparison result signal Sd, and its detailed description will hereinafter be described with reference to FIGS. 3 to 9.

As shown in FIG. 9, the feedback controller 150 shown in FIG. 3 determines the comparison result signal Sd to be a high level signal when the bias voltage Vbias is lower than the predetermined voltage Vset, such that it generates the high-level comparison result signal Sd. Otherwise, if the bias voltage Vbias is higher than the predetermined voltage Vset, the feedback controller 150 determines the comparison result signal Sd to be a low level signal, such that it generates the low-level comparison result signal Sd.

The switching controller 160 generates the switching signal Ssw upon receiving the comparison result signal Sd from the feedback controller 150, and its detailed description will hereinafter be described with reference to FIGS. 3 to 6.

Referring to FIGS. 3 to 6, in the case where the PFM (Pulse Frequency Modulation) scheme is adapted to the switching controller 160, the synchronizer 161 of the switching controller 160 controls the comparison result signal Sd generated from the feedback controller 150 to be synchronized with the clock signal Sclk of the frequency-divider/duty controller 130, such that it generates a synchronized signal Sd' as shown in FIG. 9.

In this case, the reason why the comparison result signal Sd generated from the feedback controller 150 is synchronized with the clock signal Sclk of the frequency-divider/duty controller 130 is to perform a more accurate switching control operation.

The AND operator 162 of the switching controller 160 performs an AND operation between the synchronized signal Sd' generated from the synchronizer 161 and the clock signal Sclk generated from the frequency-divider/duty controller 130, such that it generates a switching signal Ssw. The buffer 163 receives the switching signal Ssw from the AND operator 162, and outputs the received switching signal Ssw.

The bias voltage generator 170 charges/discharges the input voltage VB upon receiving the switching signal Ssw from the switching controller 160, such that it regulates the bias voltage Vbias of the drive 140 by charging/discharging the input voltage VB, and its detailed description will hereinafter be described with reference to FIGS. 3 to 7.

Referring to FIGS. 3 to 7, the switching unit 171 of the bias voltage regulator 170 switches on or off a connection between the input voltage Vb and the ground terminal upon receiving the switching signal Ssw from the switching controller 160.

For example, provided that the switching unit 171 is implemented with a P-channel MOSFET, the switching unit 171 is switched off when the switching signal Ssw is high in level. Therefore, the connection between the input voltage Vb and the ground terminal is switched off, and the input voltage VB is charged with a capacitor C1 via a coil L1 and a diode D1, such that the bias voltage Vbias is stepped up. Otherwise, in the case where the switching signal Ssw is low in level, the switching unit 171 is switched on. Therefore, the connection between the input voltage VB and the ground terminal is switched on, the input voltage VB is bypassed to the ground terminal, and at the same time the voltage charged in the capacitor C1 is discharged to the terminal of the bias voltage Vbias, such that the bias voltage Vbias is stepped down.

For example, if the bias voltage Vbias is lower than the predetermined voltage Vset, the synchronized signal Sd' is high in level, such that the switching unit 171 is repeatedly switched on or off in response to a frequency (e.g., 1 MHz) of the clock signal Sclk. Therefore, the charging/discharging unit 172 repeatedly charges/discharges the input voltage VB, such that the bias voltage Vbias is gradually stepped up toward the predetermined voltage Vset.

Otherwise, if the bias voltage Vbias is higher than the predetermined voltage Vset, the synchronized signal Sd' is low in level, such that the switching unit 171 remains in the switched-on state. As a result, the charging/discharging unit 172 enters the discharging mode, such that the bias voltage Vbias is gradually stepped down toward the predetermined voltage Vset.

Using the aforementioned operations, the bias voltage Vbias is regulated by the predetermined voltage Vset according to the PFM (Pulse Frequency Modulation) scheme. Therefore, the predetermined voltage Vset is changed by the user, such that the bias voltage Vbias is adjusted to be a user-desired voltage, and is then applied to the drive 140.

For example, if the input voltage VB is determined to be about 2.5V~5V, the bias voltage Vbias can be adjusted in the range from about 0.8V to 2.5V.

Thereafter, the drive 140 amplifies the square-wave signal Ss received from the frequency-divider/duty controller 130 at an amplification rate determined by the bias voltage Vbias, such that it generates a first square-wave signal So1, and generates a second square-wave signal So2 by inverting the first square-wave signal So1. Referring to FIG. 7, the first and second square-wave signals So1 and So2 having opposite phases are transmitted as a pair of square-wave drive signals Sout to the LL.

In more detail, the peak-to-peak voltage Vpp of the drive signals So1 and So2 contained in the LL's square-wave drive signal Sout is adjusted in the range of about 0.0V~40V according to the bias voltage Vbias. For example, if the bias voltage Vbias is adjusted in the range of 0.8V~2.5V, it is understood that the peak-to-peak value Vpp of the drive signals So1 and So2 can be adjusted in the range from the lowest peak-to-peak value Vpp-min of 3.19V shown in FIG. 10a to the highest peak-to-peak value Vpp-max of 38.4V shown in FIG. 10b.

Referring to FIG. 11, the LL adapted to the drive device of the present invention adjusts its curvature according to a peak-to-peak voltage Vpp generated at both ends of the first and second drive signals So1 and So2 contained in the square-wave drive signal Sout, such that focusing and zoom functions of the camera module adapted to the drive device of the present invention can be carried out.

The aforementioned variable square-wave drive device of the present invention varies the LL's curvature in response to the peak-to-peak values of the first and second square-wave signals So1 and So2 contained in the square-wave drive signal Sout applied to the LL, such that it can perform a focus- or zoom-function of a camera module adapted to the variable square-wave drive device. Also, the variable square-wave drive device of the present invention can correctly and precisely control the LL's curvature using a feedback control method.

As apparent from the above description, the present invention relates a variable square-wave drive device for use in camera modules such as an HHP (Hand Held Phone). The variable square-wave drive device controls square waves using a feedback- or bias-control method to vary the square waves, such that it can correctly control a curvature of an LL (Liquid Lens) and can more precisely and stably control focus and zoom functions of a camera module.

The camera module for use in the present invention can be adapted to a variety of image-capturing devices. Particularly, a specific camera module having the LL can be configured in the form of a small-sized product, does not require mechanical mechanisms for focus and zoom functions, such that it can be manufactured in the form of a small-sized configuration and can be easily applied to mobile phones such as HHPs each requiring low power consumption.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A variable square-wave drive device for controlling a pair of square-wave drive signals having opposite phases, comprising:
   a power-supply unit for receiving an input voltage, and transmitting a necessary voltage to individual components;
   an oscillator for generating a clock pulse having a predetermined frequency;
   a frequency-divider/duty controller for receiving the clock pulse from the oscillator, frequency-dividing the clock pulse using predetermined frequency division rates, and generating a clock signal and a square-wave signal;
   a drive for receiving the square-wave signal from the frequency-divider/duty controller, amplifying the square-wave signal at an amplification rate determined by a bias voltage, generating first and second square-wave signals having opposite phases according to the amplified square-wave signal, and outputting the first and second square-wave signals as a pair of square-wave drive signals;
   a feedback controller for comparing a predetermined voltage variably determined by a user with the bias voltage of the drive, and generating a comparison result signal;
   a switching controller for generating a switching signal according to the comparison result signal received from the feedback controller; and
   a bias voltage regulator for charging/discharging the input voltage of the drive according to the switching signal of the switching controller, and regulating the bias voltage of the driver by charging/discharging the input voltage.

2. The variable square-wave drive device according to claim 1, wherein the power-supply unit is powered on or off by an input power-saving signal, receives the input voltage when it is powered on, and provides individual components with necessary voltages.

3. The variable square-wave drive device according to claim 1, wherein the frequency-divider/duty controller includes:
   a frequency divider for receiving the clock pulse from the oscillator, frequency-dividing the clock pulse using individual frequency division rates to generate a plurality of frequency division pulses, and frequency-dividing the clock pulse using a predetermined square-wave frequency division rate to generate a square-wave signal; and
   a NAND operator for performing a NAND operation of the plurality of frequency division signals received from the frequency-divider, and generating a clock signal.

4. The variable square-wave drive device according to claim 1, wherein the switching controller is synchronized with the clock signal of the frequency-divider/duty controller, and generates a switching signal according to the comparison result signal from the feedback controller.

5. The variable square-wave drive device according to claim 1, wherein the switching controller is synchronized with the clock signal of the frequency-divider/duty controller, and generates a switching signal using a Pulse Time Modulation (PTM) scheme according to the comparison result signal from the feedback controller.

6. The variable square-wave drive device according to claim 1, wherein the switching controller includes:
   an AND operator for performing an AND operation between the comparison result signal received from the feedback controller and the clock signal received from the frequency-divider/duty controller, so that it generates a switching signal.

7. The variable square-wave drive device according to claim 1, wherein the switching controller includes:
   a synchronizer synchronized with the clock signal of the frequency-divider/duty controller 130 to generate the comparison result signal received from the feedback controller;
   an AND operator for performing an AND operation between the output signal of the synchronizer and the clock signal of the frequency-divider/duty controller to generate a switching signal; and
   a buffer for generating a switching signal received from the AND operator.

8. The variable square-wave drive device according to claim 1, wherein the bias voltage regulator includes:
   a switching unit for switching on or off a connection between the input voltage and a ground terminal according to the switching signal received from the switching controller; and
   a charging/discharging unit for charging/discharging the input voltage according to the switching on/off operations of the switching unit, such that it adjusts the bias voltage of the drive.

9. The variable square-wave drive device according to claim 1, further comprising:
   a liquid lens (LL) driven by a pair of square-wave drive signals having opposite phases, and controlled by a peak-to-peak value of the square-wave drive signals.

10. The variable square-wave drive device according to claim 9, wherein the power-supply unit is powered on or off by an input power-saving signal, receives the input voltage when it is powered on, and provides individual components with necessary voltages.

11. The variable square-wave drive device according to claim 9, wherein the frequency-divider/duty controller includes:
    a frequency divider for receiving the clock pulse from the oscillator, frequency-dividing the clock pulse using individual frequency division rates to generate a plurality of frequency division pulses, and frequency-dividing the clock pulse using a predetermined square-wave frequency division rate to generate a square-wave signal; and
    a NAND operator for performing a NAND operation of the plurality of frequency division signals received from the frequency-divider, and generating a clock signal.

12. The variable square-wave drive device according to claim 9, wherein the switching controller is synchronized with the clock signal of the frequency-divider/duty controller, and generates a switching signal according to the comparison result signal from the feedback controller.

13. The variable square-wave drive device according to claim 9, wherein the switching controller is synchronized with the clock signal of the frequency-divider/duty controller, and generates a switching signal using a Pulse Time Modulation (PTM) scheme according to the comparison result signal from the feedback controller.

14. The variable square-wave drive device according to claim 9, wherein the switching controller includes:
    an AND operator for performing an AND operation between the comparison result signal received from the feedback controller and the clock signal received from the frequency-divider/duty controller, so that it generates a switching signal.

15. The variable square-wave drive device according to claim 9, wherein the switching controller includes:
- a synchronizer synchronized with the clock signal of the frequency-divider/duty controller 130 to generate the comparison result signal received from the feedback controller;
- an AND operator for performing an AND operation between the output signal of the synchronizer and the clock signal of the frequency-divider/duty controller to generate a switching signal; and
- a buffer for generating a switching signal received from the AND operator.

16. The variable square-wave drive device according to claim 9, wherein the bias voltage regulator includes:
- a switching unit for switching on or off a connection between the input voltage and a ground terminal according to the switching signal received from the switching controller; and
- a charging/discharging unit for charging/discharging the input voltage according to the switching on/off operations of the switching unit, such that it adjusts the bias voltage of the drive.

* * * * *